Patented Sept. 18, 1928.

1,684,762

UNITED STATES PATENT OFFICE.

ERICH FISCHER AND CARL ERICH MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

YELLOW AZO DYESTUFF AND PROCESS OF PREPARING THE SAME.

No Drawing. Application filed April 20, 1927, Serial No. 185,356, and in Germany May 3, 1926.

Our present invention relates to the manufacture of a yellow azo dyestuff.

It is known that by far most of the yellow monoazodystuffs hitherto used for dyeing acetate silk, yield phototrope dyeings on the acetate silk. Such yellow phototrope dyestuffs, especially in mixtures with red and blue dyestuffs, temporarily lose their yellowish color after having been exposed a short time to the light, but regain it by lying in the dark.

Now we have found that the dyestuff obtainable from diazotized para-nitraniline and 1-nitro-2.4-diaminobenzene has the property of dyeing acetylcellulose a beautiful, non-phototrope, golden-yellow shade of excellent fastness properties.

The said properties of the new dyestuff are particularly remarkable in view of the fact that for instance the dyestuff obtained by coupling diazotized meta-nitraniline with 1-nitro-2.4-diaminobenzene yields only very weak dyeings on acetate silk. It is true that other combinations with nitro-meta-phenylenediamine such as for example diazotized aniline coupled with nitro-meta-phenylenediamine, diazotized para-chloraniline coupled with nitro-meta-phenylenediamine, diazotized ortho-toluidine coupled with nitro-meta-phenylenediamine, diazotized para-aminomethylacetanilide coupled with nitro-meta-phenylenediamine or the like, yield on acetyl cellulose beautiful and deep dyeings, but they are, without exception, highly phototrope.

The following example serves to illustrate our invention, but it is not intended to limit it thereto, the parts being by weight:

153 parts of 1-nitro-2.4-diaminobenzene are dissolved in hot water and this solution is quickly poured into ice while well stirring. Into the coupling suspension thus prepared is introduced a diazo solution obtained in known manner from 138 parts of para-nitraniline. After having stirred the mass for several hours, the coupling process is complete. The dyestuff is filtered by suction and forms, when dry, a yellow powder of the following composition:

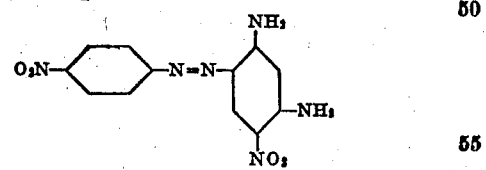

The dyestuff is particularly suitable for printing acetate silk.

We claim:

1. The process of preparing a yellow azo dyestuff, particularly suitable for dyeing and printing acetate silk, which consists in coupling diazotized para-nitraniline with 1-nitro-2.4-diaminobenzene.

2. As a new product, the azo dyestuff which is substantially identical with the dyestuff produced by the hereindescribed process of coupling diazotized para-nitraniline with 1-nitro-2.4-diaminobenzene, being a yellow powder and dyeing acetate silk a beautiful, non-phototrope, golden-yellow shade of excellent properties as to fastness.

3. Acetate silk, dyed or printed with the azo dyestuff referred to in claim 2.

In testimony whereof, we affix our signatures.

ERICH FISCHER.
CARL ERICH MÜLLER.